(12) United States Patent
Schmidt et al.

(10) Patent No.: US 7,837,203 B1
(45) Date of Patent: Nov. 23, 2010

(54) WHEELCHAIR CONVERTED VEHICLE HAVING INDEPENDENT REAR SUSPENSION AND METHOD OF MANUFACTURING

(75) Inventors: Michael J. Schmidt, Queen Creek, AZ (US); Michael J. Weiland, Scottsdale, AZ (US); Neil B. O'Leary, Tempe, AZ (US)

(73) Assignee: Vantage Mobility International, LLC, Phoenix, AZ (US)

( * ) Notice: Subject to any disclaimer, the term of this patent is extended or adjusted under 35 U.S.C. 154(b) by 243 days.

(21) Appl. No.: 12/022,025

(22) Filed: Jan. 29, 2008

Related U.S. Application Data

(60) Provisional application No. 60/898,037, filed on Jan. 29, 2007.

(51) Int. Cl.
*B60P 3/00* (2006.01)
*B60P 1/34* (2006.01)
*B60P 1/43* (2006.01)

(52) U.S. Cl. .............. 280/6.152; 280/6.157; 280/43.11; 414/921

(58) Field of Classification Search .......... 280/124.116, 280/6.152, 6.157, 43.1, 43, 43.11; 414/921
See application file for complete search history.

(56) References Cited

U.S. PATENT DOCUMENTS

| | | | |
|---|---|---|---|
| 2,988,376 A * | 6/1961 | Chausson | 280/6.152 |
| 3,669,467 A * | 6/1972 | Dunlap et al. | 280/124.116 |
| 3,727,939 A * | 4/1973 | Mykolenko | 280/124.1 |
| 4,223,910 A | 9/1980 | Fry | 280/124.11 |
| 4,248,455 A * | 2/1981 | Manning | 280/6.152 |
| 4,269,432 A | 5/1981 | Inoue et al. | 280/690 |
| 4,273,356 A | 6/1981 | Sakata et al. | 280/675 |
| 4,453,737 A * | 6/1984 | Burchard et al. | 280/124.116 |
| 4,458,913 A | 7/1984 | Rumpel | 280/663 |
| 4,518,171 A | 5/1985 | Hedenberg | 280/711 |
| 4,756,546 A | 7/1988 | Kubo et al. | 280/661 |
| 4,832,363 A | 5/1989 | Mitobe | 280/690 |
| 4,838,573 A | 6/1989 | Specktor et al. | 280/661 |
| 4,840,396 A | 6/1989 | Kubo | 280/690 |
| 4,847,972 A * | 7/1989 | Anderson et al. | 29/401.1 |
| 5,000,477 A | 3/1991 | Minakawa et al. | 280/690 |
| 5,022,673 A | 6/1991 | Sekino et al. | 280/673 |
| 5,447,325 A * | 9/1995 | DePue et al. | 280/124.106 |
| RE35,168 E * | 3/1996 | Golpe | 280/124.116 |

(Continued)

OTHER PUBLICATIONS

Author unknown, "Independent Suspension System", [Online], http://www.automobileindia.com/Timeline/time22.html, Mar. 28, 2006.

(Continued)

*Primary Examiner*—Paul N Dickson
*Assistant Examiner*—Nicole Verley
(74) *Attorney, Agent, or Firm*—Fennemore Craig, P.C.

(57) ABSTRACT

A wheelchair conversion vehicle and a method of manufacturing a wheelchair conversion vehicle include replacing the OEM trailing arm with a trailing arm substitute and substantially reproducing the movement of the rear wheel OEM spindle along first or second arc paths between an upper limit and a lower limit. The upper limit is a distance above the OEM ride height and the lower limit is a distance below the OEM ride height. The conversion vehicle and method of manufacturing further include installing a wheelchair access system to provide wheelchair access to the wheelchair conversion vehicle.

42 Claims, 9 Drawing Sheets

U.S. PATENT DOCUMENTS

| | | | | |
|---|---|---|---|---|
| 5,560,638 | A | 10/1996 | Lee | 280/690 |
| 5,700,026 | A * | 12/1997 | Zalewski et al. | 280/6.152 |
| 5,871,329 | A | 2/1999 | Tidrick et al. | 414/537 |
| 5,895,063 | A | 4/1999 | Hasshi et al. | 280/124.134 |
| 5,992,868 | A | 11/1999 | Orimoto | 280/124.138 |
| 6,010,182 | A | 1/2000 | Townsend | 296/203.01 |
| 6,071,064 | A | 6/2000 | Hackett | 414/545 |
| 6,098,995 | A * | 8/2000 | Danis | 280/6.152 |
| 6,386,553 | B2 | 5/2002 | Zetterstrom | 280/5.51 |
| 6,494,519 | B2 | 12/2002 | Sturgin et al. | 296/50 |
| 6,698,775 | B2 * | 3/2004 | Ness | 280/86.757 |
| 6,796,569 | B2 | 9/2004 | Pankau | 280/124.155 |
| 6,825,628 | B2 * | 11/2004 | Heigl et al. | 318/468 |
| 7,014,201 | B2 | 3/2006 | Lee | 280/124.13 |
| 7,152,866 | B2 * | 12/2006 | Chalin et al. | 280/86.5 |
| 7,237,779 | B2 * | 7/2007 | Kondo et al. | 280/6.157 |
| 2002/0130479 | A1 * | 9/2002 | Eckelberry et al. | 280/124.109 |
| 2007/0194550 | A1 * | 8/2007 | Wadelton | 280/124.116 |

OTHER PUBLICATIONS

Author unknown, "The Suspension Bible", [Online], Available, http://www.carbibles.com/suspension_bible.html, Oct. 31, 2006.

Coleman, Dave, "Technobabble: Aug. 2000 Arcs, Curves and Loony Bins", [Online], Available, http://www.sportcompactcarweb.com/editors/technobabble/0008scc_technobabble/, Apr. 13, 2006.

Author Unknown, "Independent Suspension Trailing arm and Semi-trailing arm suspension", [Online], Available, http://www.autozine.org/technical_school/suspension/tech_suspension21.htm, Nov. 2, 2006.

* cited by examiner

WHEELCHAIR CONVERTED VEHICLE HAVING INDEPENDENT REAR SUSPENSION AND METHOD OF MANUFACTURING

CROSS-REFERENCE TO RELATED APPLICATIONS

This application is based on and claims the priority to U.S. Provisional Patent Application No. 60/898,037 filed on Jan. 29, 2007, the disclosure of which is incorporated herein in its entirety.

FIELD OF THE INVENTION

The invention is directed to a method of providing wheelchair access to an OEM (Original Equipment Manufacturer) vehicle having independent rear suspension. The invention is also directed to a wheelchair converted OEM vehicle comprising a trailing arm substitute.

BACKGROUND OF THE INVENTION

Presently there are no major automobile manufacturers that mass-produce highway vehicles that accommodate wheelchair access for private use. Consequently, these OEM vehicles must be modified and converted to properly accommodate wheelchair access. One problem encountered during the wheelchair accessibility conversion process of vehicles having independent rear suspension is that when the floor is sufficiently lowered to accommodate a side door wheelchair ramp system, the rear suspension trailing arm protrudes several inches into the vehicle side door opening area, preventing the installation and operation of a ramp system. If the trailing arm is simply shortened so as not to extend into the side door opening, the OEM rear suspension motion is substantially altered, providing for a lower quality performance and ride as compared to the unmodified OEM vehicle. Shortening the trailing arm also compromises the ride safety of the vehicle, which is unacceptable with today's vehicle safety standards, and typically voids the OEM vehicle warranty. The lowering of the floor of the vehicle to accommodate the ramp system also lowers the vehicle's OEM ground clearance. Raising the vehicle frame to obtain OEM ground clearance after the floor is lowered has the potential of significantly altering the OEM suspension motion and safety of the vehicle.

As can be seen, a need exists in the art for a method of efficiently converting an OEM vehicle having rear independent suspension in such a way to adequately accommodate a wheelchair ramp while substantially preserving the ride safety, performance, and quality of the OEM suspension, thereby producing a wheelchair accessible vehicle that is substantially as comfortable and safe to drive as the unmodified OEM vehicle.

It is an objective of this invention to provide a method for effectively producing a side door wheelchair accessible vehicle from an OEM vehicle, e.g., a minivan, while retaining the OEM suspension design, ride quality, and sufficient ground clearance.

SUMMARY OF THE INVENTION

The present invention is directed to a method of converting an OEM vehicle having independent rear suspension into a wheelchair accessible vehicle with a side access wheelchair ramp. The present invention provides wheelchair access through the side door of a vehicle with a lowered floor while retaining the OEM suspension design intent and ride quality, and creating sufficient ground clearance. Further, the invention provides a converted rear suspension system that is compatible with the side door wheelchair access and a vehicle lowering system. The presently disclosed wheelchair access conversion process maintains the OEM wheel arc path and geometry through its operating range of motions (full bump and droop) while also reducing the physical space consumed by the rear suspension components to provide space for the wheelchair access system.

Preferably the disclosed conversion process includes the steps of:

a) providing an OEM vehicle having a vehicle body, at least one rear side door opening between a front door and a rear wheel of the vehicle body, and independent rear suspension, wherein the independent rear suspension comprises an OEM trailing arm having a first end and a second end, the OEM trialing arm being pivotally connected to the vehicle body at the first end and fixedly connected to a rear wheel OEM spindle at a second end, the OEM trailing arm being disposed in a longitudinal direction of the vehicle extending under the OEM floor beneath the rear side door opening allowing the OEM spindle to move through an OEM spindle arc path;

b) lowering the OEM vehicle floor in the rear side door opening area sufficiently to accommodate the side access wheelchair ramp;

c) replacing the OEM trailing arm with a trailing arm substitute, wherein the trailing arm substitute comprises an upper arm, a lower arm, a floor mount, and a spindle mount, the upper arm and lower arm each having a first end and a second end, the first end being pivotally connected to the floor mount and the second end being pivotally connected to the spindle mount, wherein the floor mount is connected to the lowered floor between the side door opening and the rear wheel so that the trailing arm substitute does not protrude into the side door opening and the spindle mount is connected to the rear wheel spindle;

d) installing a wheelchair access system that when deployed extends out the rear side door, thereby converting an OEM vehicle having independent rear suspension into a converted OEM wheelchair accessible vehicle having a side wheelchair access system.

The present invention is further directed to a converted OEM wheelchair accessible vehicle having a side access wheelchair system. The converted OEM wheelchair accessible vehicle preferably has:

a) a wheelchair converted vehicle body comprising a vehicle floor and at least one rear side door and rear side door opening, the rear side door and rear side door opening being between a front door and a rear wheel of the vehicle and the vehicle floor being sufficiently lower than the OEM floor to accommodate the side access wheelchair ramp;

b) a converted independent rear suspension, wherein the converted independent rear suspension comprises a trailing arm substitute which replaces an OEM rear trailing arm, wherein the trailing arm substitute comprises an upper arm, a lower arm, a floor mount, and a spindle mount, the upper arm and lower arm each having a first end and a second end, the first end being pivotally connected to the floor mount and the second end being pivotally connected to the spindle mount, wherein the floor mount is connected to the lowered floor between the side door opening and the rear wheel so that the trailing arm substitute does not protrude into the side door opening and the spindle mount is connected to the rear wheel spindle; and c) a side wheelchair access system, wherein when deployed it extends out the rear side door.

DETAILED DESCRIPTION

Figure 1:
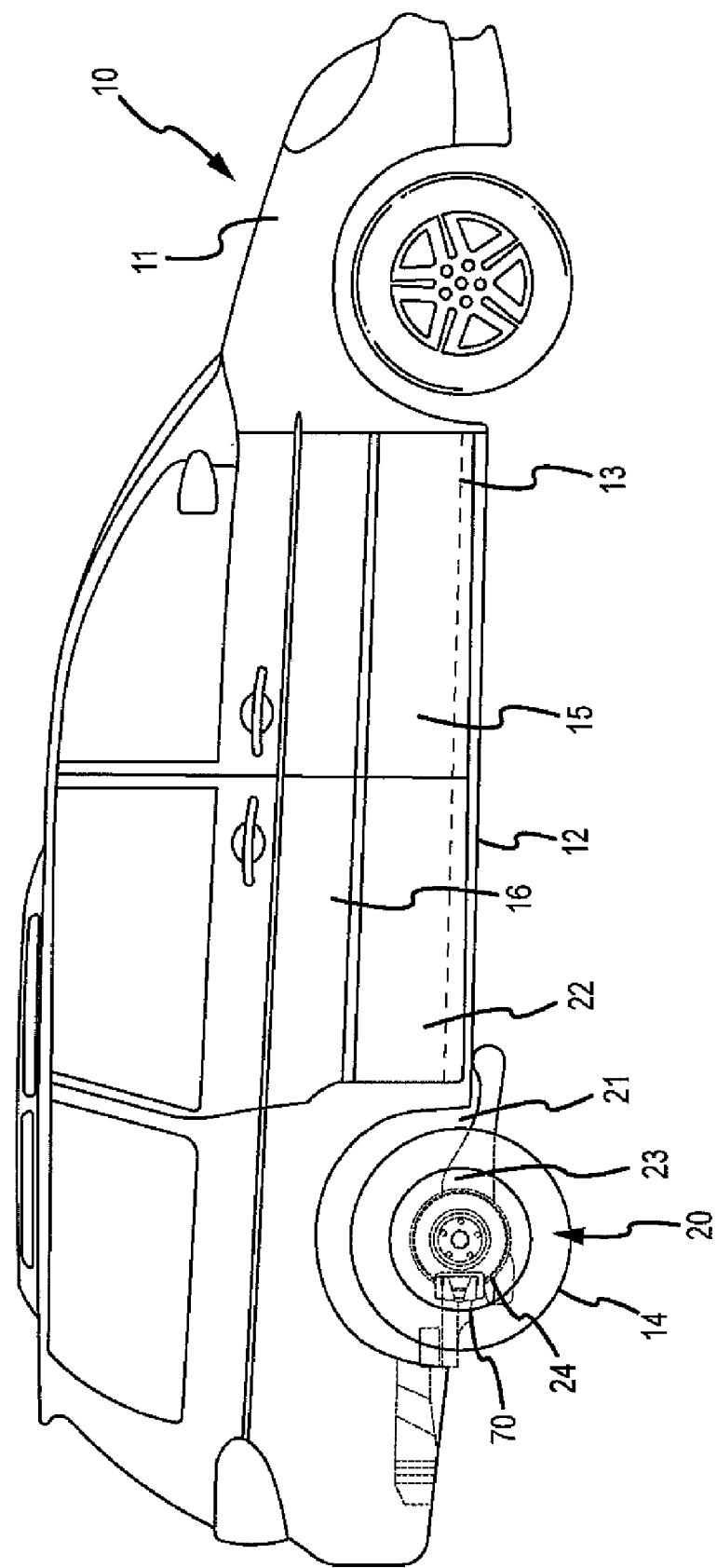
FIG. 1 shows an unconverted OEM vehicle having independent rear suspension, and further showing the internal OEM trailing arm extending under the vehicle floor located at the rear side door opening before the OEM floor is lowered.

The present invention will now be further described by way of example with reference to the accompanying drawings, which illustrate the invention for better understanding of its specific structures and advantages. The figures are not necessarily to scale, some features may be exaggerated or minimized to show details of particular components or processes. Therefore, specific structural and functional details disclosed herein are not to be interpreted as limiting, but merely as a representative basis for teaching one skilled in the art to variously employ the present invention.

As shown in the FIGS., the present invention is directed to a converted wheelchair accessible vehicle 30 having independent rear suspension 20 with a side access wheelchair ramp system 40 and also to a method of converting an OEM vehicle 10 into such a wheelchair accessible vehicle 30. The method advantageously allows the OEM suspension 20 design intent and ride quality to be maintained while providing appropriate wheelchair access to the vehicle.

In general, the conversion process includes the steps of:

a) providing an OEM vehicle 10 having independent rear suspension 20 comprising an OEM trailing arm that protrudes into the side door opening if the floor 15 is lowered;

b) lowering the OEM vehicle floor 15 sufficiently to provide increased head room for the wheelchair occupants and to accommodate the side access wheelchair ramp 41;

c) replacing the OEM trailing arm 21 with a trailing arm substitute 50 that does not protrude into the side door opening 12; and d) installing a wheelchair access system 40 that when deployed extends out the rear side door 16.

Figure 2:
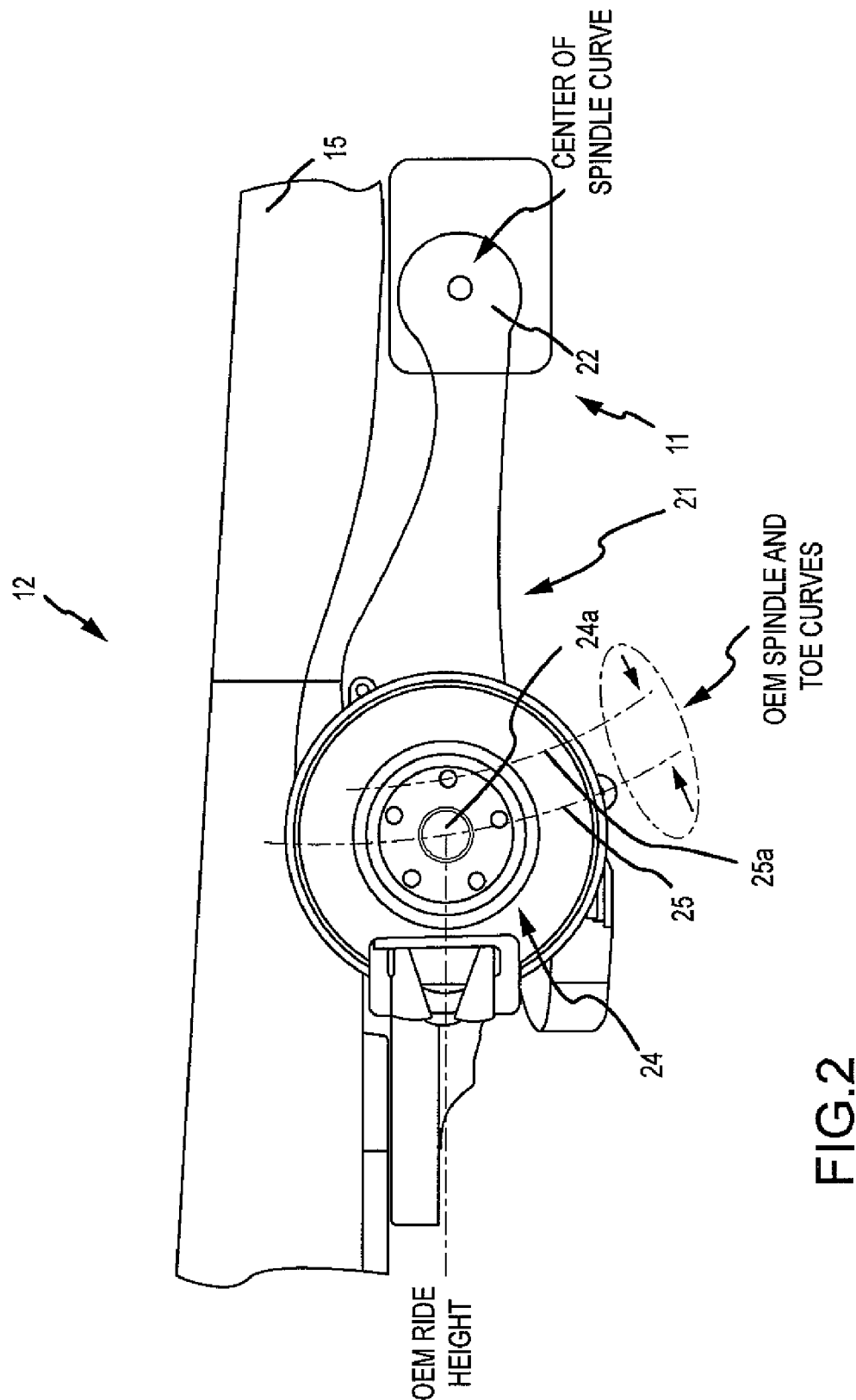
FIG. 2 is a side view of the unconverted OEM independent rear suspension, including the OEM trailing arm that is disposed longitudinally extending under an OEM vehicle floor located at the rear side door opening of the vehicle, being pivotably attached to the vehicle body, while also being attached to the spindle.

As shown in FIG. 1, the OEM vehicle 10 used for the conversion process has a vehicle body 11, at least one rear side door opening 12 between a front door 13 and a rear wheel 14 of the vehicle body 11, and independent rear suspension 20. The independent rear suspension 20 comprises an OEM trailing arm 21 on each side of the OEM vehicle 10. As shown in FIG. 2, the OEM trailing arm 21 generally has a first end 22 and a second end 23. The OEM trailing arm 21 is pivotally connected to the vehicle body 11 at the first end 22 and fixedly connected to a rear wheel OEM spindle 24 at a second end. The OEM trailing arm 21 is typically disposed in a longitudinal direction of the vehicle 10 extending under an OEM vehicle floor 15 beneath the rear side door opening 12 of the vehicle 10 allowing the OEM spindle 24 to move through an OEM spindle arc path 25. Therefore, if the OEM vehicle floor 15 is lowered the OEM trailing arm 21 would necessarily protrude into the rear side door opening 12.

The OEM vehicle body 11 can be any vehicle body with the rear side door opening 12. In a preferred embodiment, the vehicle body 11 is a van, and more preferably a minivan. In one embodiment the vehicle body 11 is a unibody designed to disseminate load-bearing structural elements throughout the entire body of the vehicle 10. An example of an OEM vehicle 10 having a suitable unibody is the 2005 Honda ODYSSEY.

Trailing Arm Substitute

Figure 3:
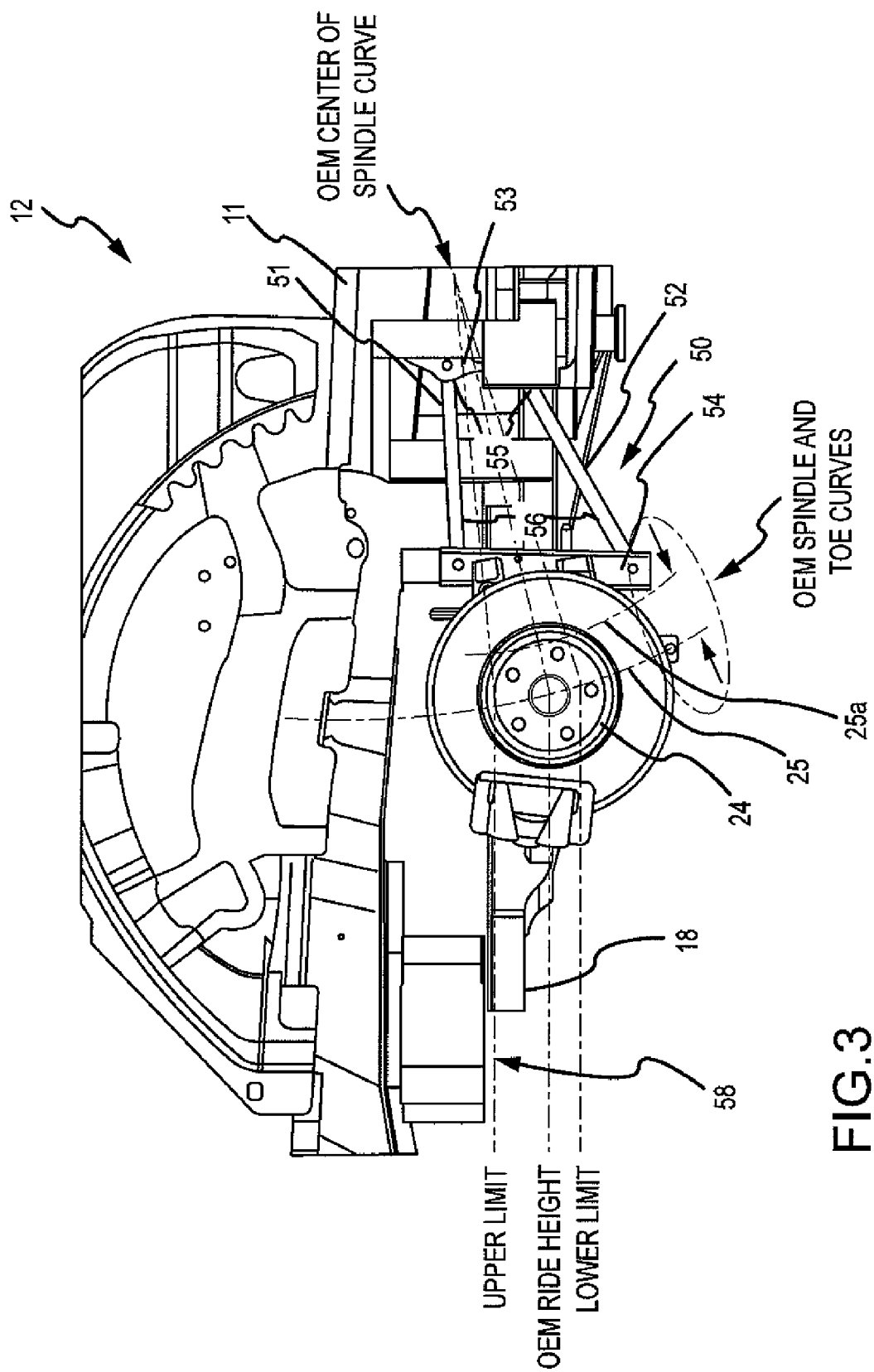
FIG. 3 is a side view of a trailing arm substitute that includes an upper arm, a lower arm, a floor mount, and a spindle mount; the upper arm and lower arm each pivotably connected to the floor mount and also pivotably connected to the spindle mount.

As shown in FIG. 3, the trailing arm substitute 50 typically comprises an upper arm 51, a lower arm 52, a floor mount 53, and a spindle mount 54. The upper arm 51 and lower arm 52 each have a first end 55 and a second end 56. The first end 55 of each is preferably pivotally connected to the floor mount 53 and the second end 56 of each is also preferably pivotally connected to the spindle mount 54. The floor mount 53 is connected to the lowered vehicle floor 28 between the side door opening 12 and the rear wheel 14 so that the trailing arm substitute 50 does not protrude into the side door opening 12. The spindle mount 54 is connected to the rear wheel spindle 24 as shown in FIG. 3.

The trailing arm substitute 50 is designed such that the upper arm 51 is shorter than the lower arm 52; in the alternative the upper arm 51 is longer than the lower arm 52; or the upper arm 51 can be the same length as the lower arm 52. The trailing arm substitute 50 is designed to control the movement of the OEM spindle 24 so as to mimic the OEM conditions in order to maintain the OEM ride quality and OEM wheel frequency.

In a preferred embodiment, each of the OEM trailing arms 21 are replaced with a trailing arm substitute 50.

Referring to FIG. 2, the OEM spindle 24 is typically attached to the vehicle body 11 with an OEM trailing arm 21 of a fixed radius. This arm 21 is fixed to the spindle 24 and pivots at the first end 22, which is the point of attachment to the vehicle body 11 and the center of the spindle arc path 25. This allows the spindle 24 to move through the defined spindle arc path (first arc path) 25. The movement of the OEM spindle 24 is further characterized by the rotation of the spindle 24 relative to the vehicle body 11 as it travels along the arc path 25. This can be defined as maintaining a constant arc path (second arc path) 25a of a second point on the spindle 24

(for example, the point of attachment of the toe-link) of which the center is coincident with the arc path 25 traced by the spindle center 24a.

Figure 4:
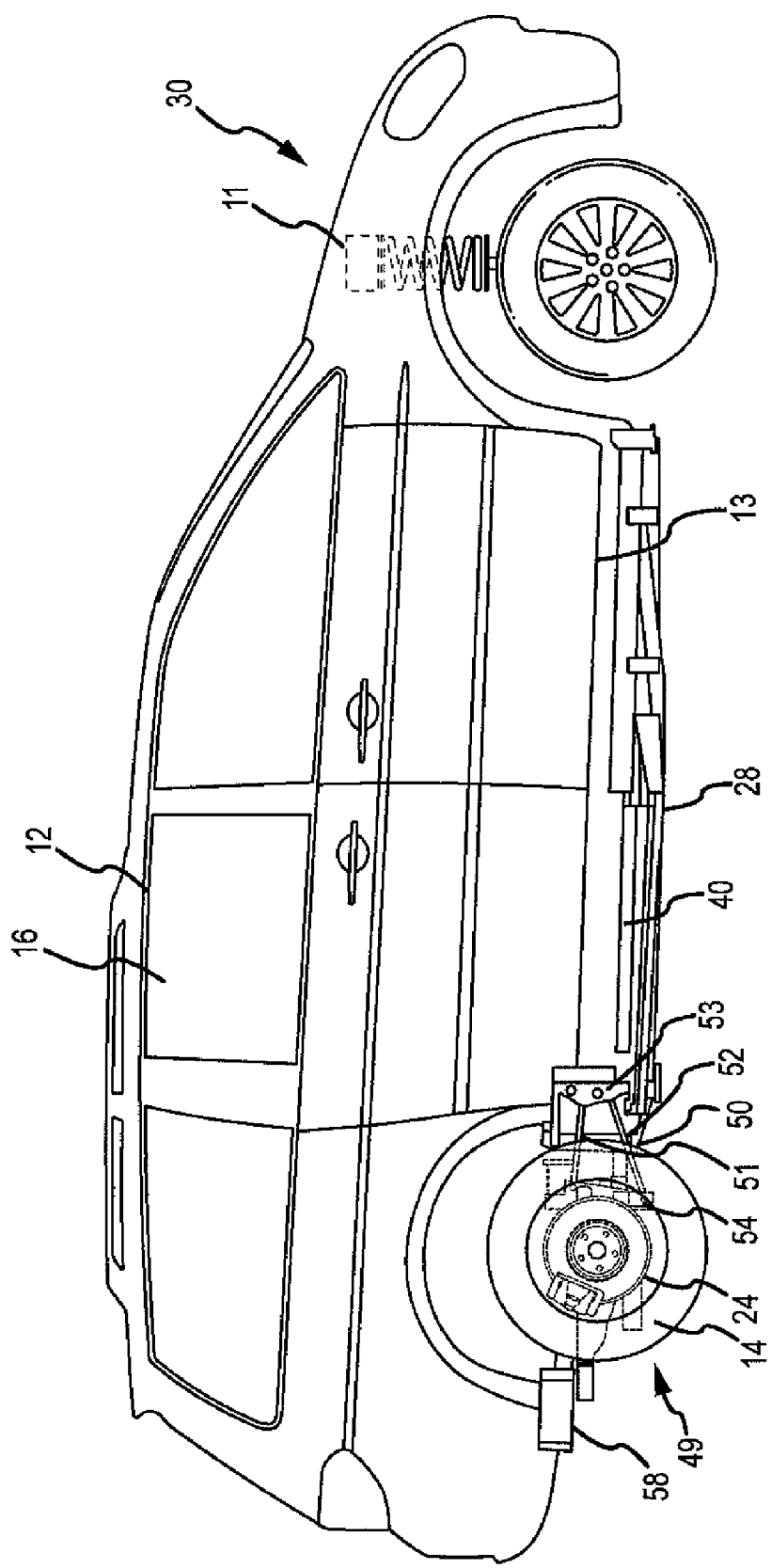
FIG. 4 is a side view of the converted wheelchair accessible vehicle with a lowered floor in the rear side door opening area sufficient to accommodate the side wheelchair access system with the trailing arm substitute installed.

By replacing the OEM trailing arm 21 with a specially designed trailing arm substitute 50, shown in FIGS. 3-4, the movement of the spindle 24 can be preserved within a certain boundary. Preferably the boundary is defined by an upper limit, referred to as "full bump," and a lower limit, referred to as "full droop". As measured at OEM ride-height, full bump is typically +3 to +4 inches, preferably +3 inches, and full droop is −1.5 to −3 inches, preferably −2 inches. Outside of these two limits, full bump and full droop, the new arc path may deviate from the OEM arc path 25 as it will not effect the ride quality of the vehicle. Preferably the trailing arm substitute 50 is designed so that within full bump and full droop the OEM arc path 25 and the new arc path are substantially identical.

The rotation of the spindle 24 relative to the vehicle body 11 is substantially reproduced to match OEM behavior between the full bump and the full droop limits. Outside of these limits, the rotation may vary from OEM behavior.

In one embodiment, the movement of the spindle 24 attached to the trailing arm substitute 50 produces an arc path within 0.5 inches, more preferably within 0.25 inches, of the OEM arc path 25 at each position between a bump of +3 inches and a droop of −2 inches as measured from OEM ride-height.

The behavior of the rear wheels as they travel through their full range of motion (between full bump and full droop) are characterized in two primary ways: toe and camber. Camber refers to the tilting of a wheel/tire. If the top of the tire is leaning outward from the car, then this is called "positive" camber or if the top of the tire is leaning in toward the car, this is called "negative" camber. Camber is typically measured in degree of tilt. For example, 2 degrees of positive camber means the top of the wheel is leaning outward 2 degrees. As the tire moves up and down between full bump and full droop the camber changes. A camber curve is derived based on the degree of camber as the wheel moves vertically. Toe, on the other hand, is the angle which the axis of rotation of the wheel makes with a horizontal axis extending perpendicular to the central longitudinal axis of the vehicle. The angle is negative when the front of the wheel is "toed-in", and positive when the front of the wheel is "toed-out."

Preferably the converted vehicle 30 has a rear wheel camber curve within ±0.75 degrees, more preferably ±0.05 degrees or most preferably less than ±0.03 degrees per inch, of the vehicle's OEM rear wheel camber curve at each position between a bump of 3 inches and a droop of 2 inches as measured from OEM ride-height. Preferably the converted vehicle 30 also has a rear wheel toe curve within ±0.3 degrees per inch, more preferably ±0.06 degrees per inch, or most preferably within ±0.03 degrees per inch of the vehicles OEM rear wheel toe curve at each position between a bump of +3 inches and a droop of −2 inches measured from OEM ride-height.

In one specific embodiment, the converted vehicle 30 with the trailing arm substitute 50 has a toe curve of ±0.01 degrees per inch of the OEM toe curve and a new camber curve within ±0.05 degrees per inch of the OEM camber curve.

The use of the trailing arm substitute 50 as taught herein, allow for a more compact overall suspension system 20, while maintaining the movement and behavior of the OEM spindle 24. This results in the preservation of the ride quality and safety of the converted vehicle 30 while increasing the amount of available space for wheelchair passengers and the ramp system 40.

Spring Substitutes

Figure 8:
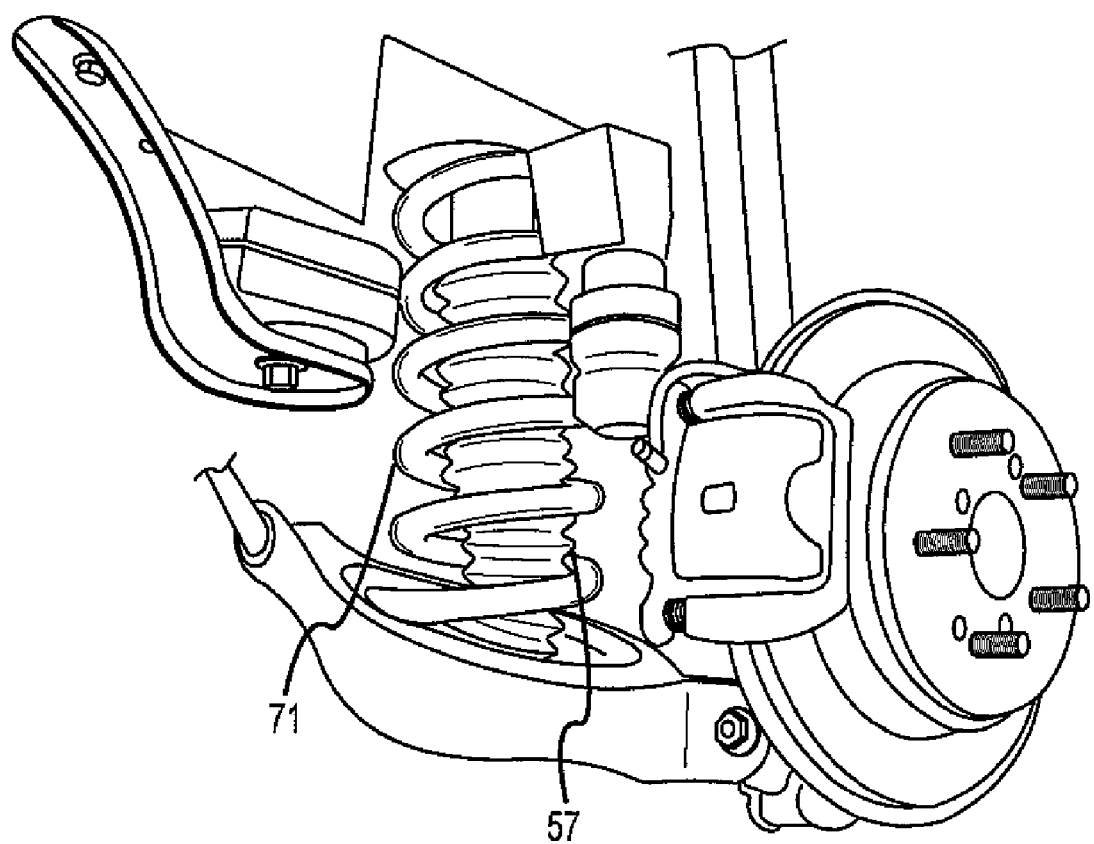
FIG. 8 is a partial perspective view of a vehicle lowering system and a spring substitute installed on the converted wheelchair accessible vehicle of FIG. 4.
Figure 9:
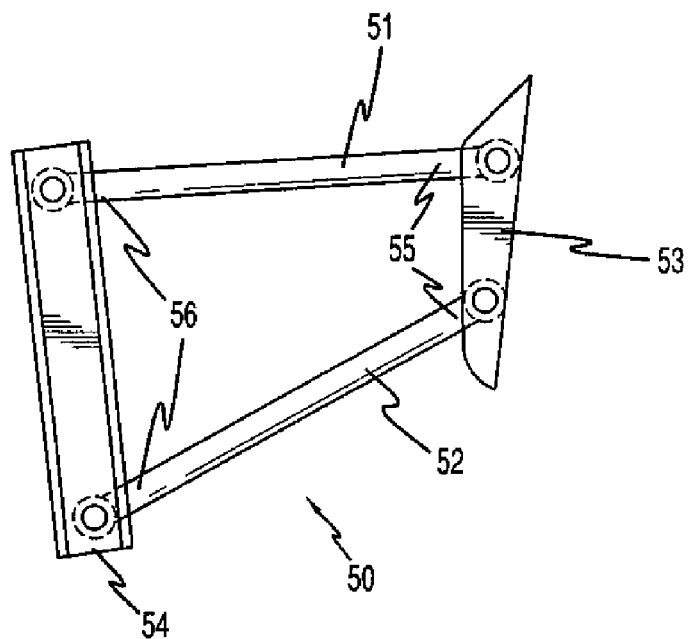
FIG. 9 is a side view of an alternate embodiment of the trailing arm substitute wherein the upper arm is the same length as the lower arm.
Figure 10:
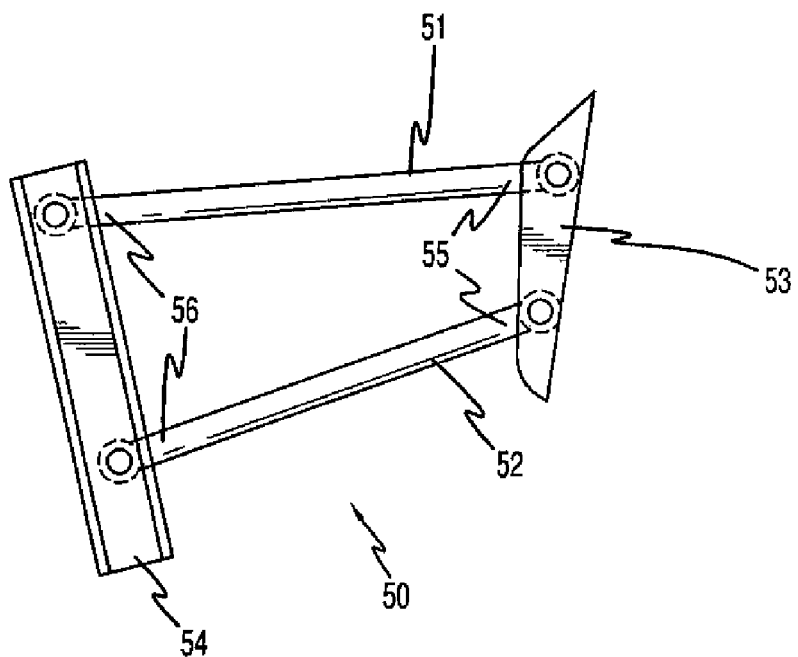
FIG. 10 is a side view of an alternate embodiment of the trailing arm substitute wherein the upper arm is longer than the lower arm.

To preserve the OEM vehicle 10 handling dynamics and proper balance of the ride quality between the front and rear suspensions, the rear OEM springs 70 are replaced with spring substitutes 71, as shown in FIG. 8. The spring substitute 71 typically has a longer length and a higher spring rate than the OEM spring 70. This allows the extra weight incorporated into the converted vehicle 30 to be carried at the proper ride height while maintaining the proper wheel frequency. The spring substitutes 71 provide a new spring rate, which can be calculated using the converted vehicle's 30 weight and a target wheel frequency. Preferably the target wheel frequency is between 1.0 and 1.4 cycles per second, more preferably the between 1.1 and 1.3 cycles per second and most preferably about 1.2 cycles per second in order to provide for a comfortable ride. Preferably, the rear spring substitute 71 is longer and has a different spring rate than the OEM suspension spring 70 to maintain an OEM wheel frequency in view of the added weight of the converted vehicle 30.

Vehicle Lowering System

In a preferred embodiment, the conversion process also includes installation of a vehicle lowering system 57 which compresses the rear spring substitutes 71 to lower the vehicle body 11 to the ground (see FIG. 8). In this embodiment, the rear spring substitutes 71 have specific parameters to prevent plastic deformation during maximum compression of the spring substitutes 71 due to the vehicle lowering system 57, thereby returning to a pre-compression height after the compression in the vehicle lowering process and maintaining the OEM wheel frequency.

Lowering the OEM Vehicle Floor

Generally, during the conversion process the OEM vehicle floor 15 is lowered sufficiently to provide increased head room and to accommodate the side access wheelchair ramp system 40 at least in the rear side door opening area 12. Preferably the vehicle floor 15 is also lowered in the front of the vehicle to allow the wheelchair bound individual the ability to access the front of the vehicle 30 and drive the vehicle 30 if appropriate.

The OEM vehicle floor 15 is typically lowered by at least 4 inches; more preferably by at least 6 or 8 inches and most preferably by at least 10 inches. In one specific embodiment, the OEM vehicle floor 15 is lowered between 10 and 12 inches in the rear side door opening area 12 and 6 to 7 inches in the front area of the vehicle 10.

Figure 6:
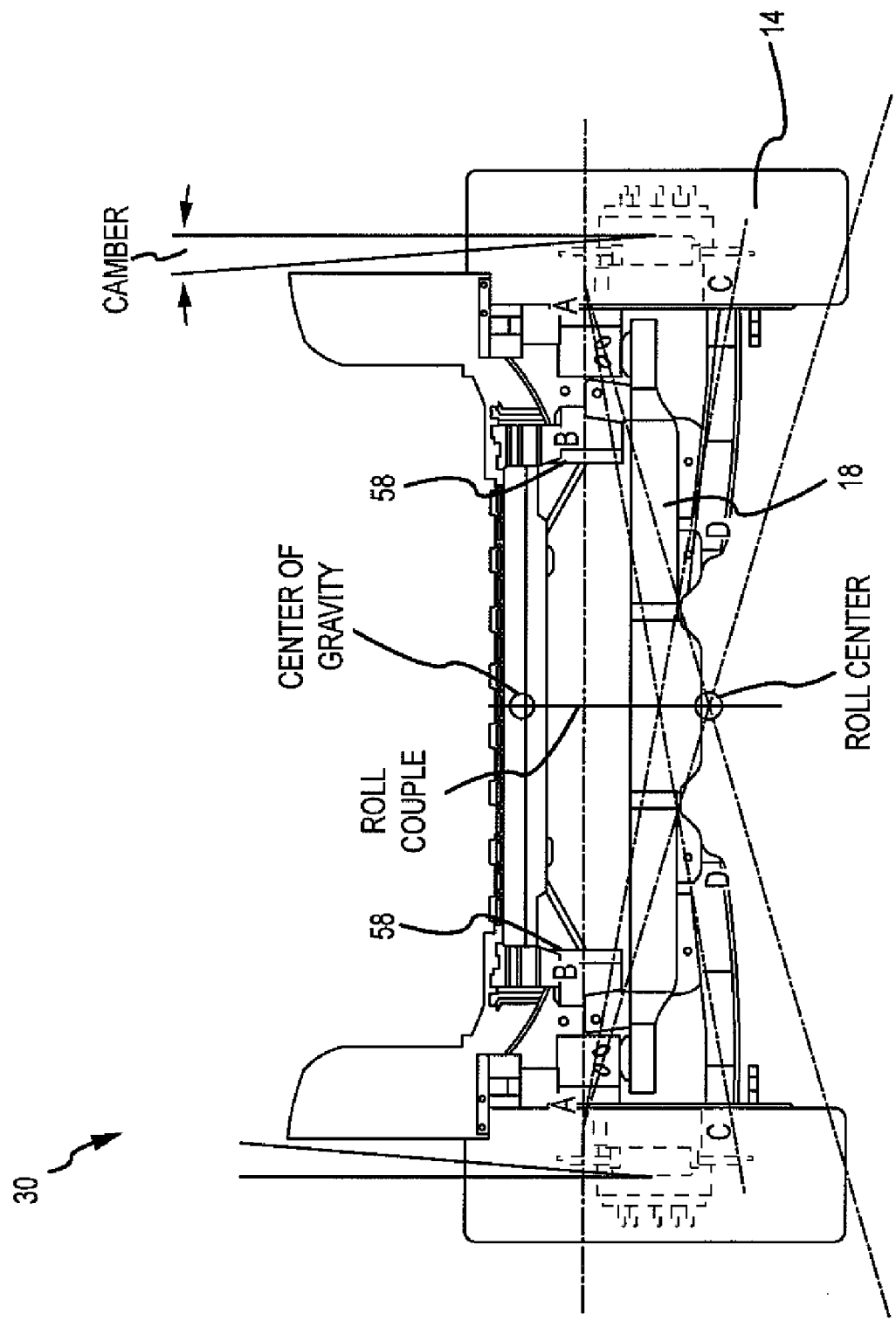
FIG. 6 is a partial rear view of the center of gravity, roll center, and roll couple of the converted wheelchair accessible vehicle of FIG. 4 after the floor has been lowered and the body lifted up off of the vehicle sub-frame sufficiently to maintain OEM ground clearance using body extensions.

In a preferred embodiment, the conversion method further includes raising the vehicle body 11 to maintain the OEM ground clearance of the suspension subframe 18 and achieve the desired ground clearance of the lowered floor 28. Raising the vehicle body 11 instead of the vehicle frame/subframe 18, allows the OEM roll center to be substantially maintained while providing sufficient ground clearance. Preferably the step of raising the vehicle body is accomplished by using body extensions 58 to raise the vehicle body 11 while allowing the suspension subframe 18 to remain at the OEM height as shown in FIGS. 3 and 6.

Figure 5:
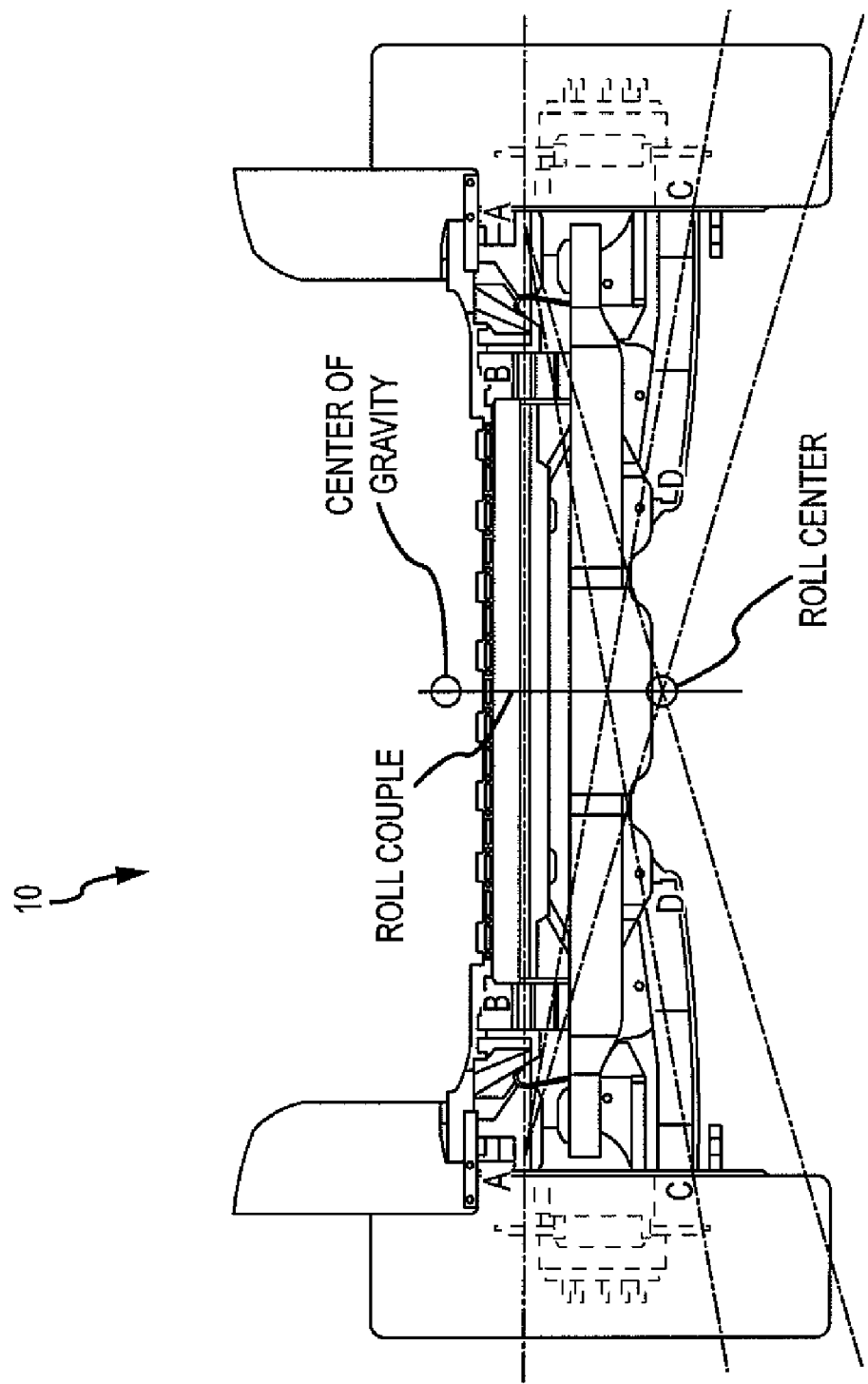
FIG. 5 is a partial rear view of the center of gravity, roll center, and roll couple of the unconverted OEM vehicle of FIG. 1.

As shown in FIG. 5, the location of the roll center in the OEM vehicle 10 is effected by the mounting points for the upper control arms (line AB) and lower control arms (line CD) of the independent rear suspension 20 in the OEM vehicle 10. The angle of these control arms determine the points where they intersect which in turn defines the location of the roll center. FIG. 6 shows the center of gravity, roll center, and roll couple of a converted wheelchair accessible vehicle 30 after the floor 15 has been lowered and the vehicle body 11 lifted up off of the vehicle sub-frame 18 to achieve the desired ground clearance of the lowered floor 28. By maintaining the OEM angle of the upper and lower control arms, the OEM roll center location is maintained.

Keeping the roll center in the OEM location after conversion also maintains the roll-couple, the imaginary line between the roll center and the vehicle's center of gravity. By preserving the roll couple, the rear suspension will stay in balance with the front suspension, thereby preserving the overall OEM vehicle handling performance.

Raising the vehicle body 11 will affect the mounting points of the suspension that are rigidly attached to the vehicle body 11. These mounting points must be relocated to restore the upper and lower control arms to their original angles, thereby preserving the location of the roll center. This is achieved by using the body extensions 58 to raise the vehicle body 11.

Preferably the vehicle body 11 is raised by at least 2 to 3 inches, more preferably by at least 3 to 6 inches. In one particular embodiment, the rear of the vehicle body 11 is raised by 4.5 inches, while the front of the vehicle body 11 is raised by 1 to 4 inches, more preferably by at least 2.5 to 3 inches. In a preferred embodiment, the body extensions 58 are designed so that the OEM bolts and materials can be used, thereby maintaining quality standards. Typically the body extensions 58 are welded to the vehicle body 11. The body extensions 58 are advantageously designed to lower the OEM body 11 and OEM subframe 18 connections points so that after the vehicle body 11 is raised, the OEM roll center location is substantially maintained within the allowed variations for the OEM roll center specifications.

Wheelchair Access System

Figure 7:
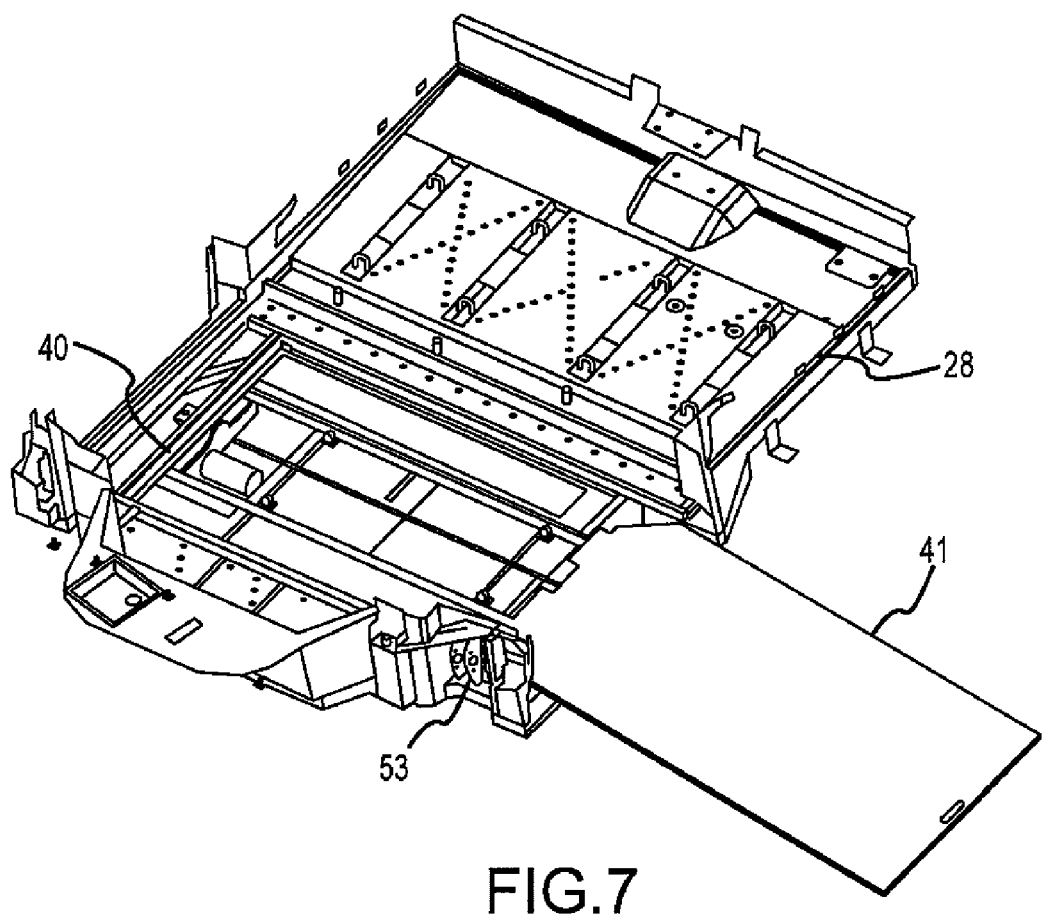
FIG. 7 shows the converted and lowered vehicle floor with a side door ramp deployed.

As shown in FIG. 7, the wheelchair access system 40 is generally designed to extend out the rear side door 16 when deployed. In the illustrated embodiment of FIG. 7, the wheelchair access system includes a ramp 41. Preferably, the ramp 41 is at least 30 inches wide, and more preferably at least 34 inches wide. An example of a suitable ramp is the VMI NORTHSTAR ramp. It will be apparent to one of ordinary skill in the art from this disclosure that the wheelchair access system can be any suitable access system that allows for the effective and safe transfer of the wheelchair from the vehicle, such as a platform lift.

As shown in FIGS. 4 and 7 and discussed above, the present invention further encompasses the converted OEM wheelchair accessible vehicle 30 having a side access wheelchair ramp. The wheelchair converted vehicle body 11 has a lowered vehicle floor 28 and at least one rear side door 16 and rear side door opening 12 both being between a front door 13 and a rear wheel 14 of the vehicle 30 and the lowered vehicle floor 28 being sufficiently lower than the OEM floor 15 to accommodate the side access wheelchair ramp 41.

Advantageously, the converted vehicle 30 also has a converted independent rear suspension 49 comprising a trailing arm substitute 50 which replaces an OEM rear trailing arm 21 as discussed above. The converted vehicle 30 generally further includes a side access wheelchair ramp system 40, wherein when the ramp 41 is deployed, it extends out the rear side door 16.

The present invention will now be illustrated by the following non-limiting example. It is to be understood that the foregoing describes preferred embodiments of the present invention and that modifications may be made therein without departing from the spirit or scope of the present invention as set forth in the claims.

EXAMPLE

Conversion of 2005 Honda Odyssey

A 2005 Honda Odyssey having independent rear suspension was obtained. The OEM vehicle floor was lowered. The floor 15 was lowered by approximately 11 inches, between 10 to 12 inches, in the rear area and between 6 and 7 inches in the front area of the converted vehicle 30.

The OEM trailing arm 21 was removed and replaced by a trailing arm substitute 50 comprising an upper arm 51, a lower arm 52, a floor mount 53, and a spindle mount 54. The upper arm 51 and lower arm 52 are pivotably connected to the floor mount 53 and pivotably connected to the spindle mount 54. In this specific embodiment, the upper arm 51 is substantially shorter than the lower arm 52.

After lowering the vehicle floor 15, the vehicle body 11 was lifted up by installing body extensions 58 in order to maintain the OEM ground clearance of the suspension subframe 18 and achieve the desired ground clearance of the lowered floor 28. The body extensions 58 were welded to the body frame and the OEM bolts were used to attach the vehicle body 11 to the subframe 18 using the body extensions 58 as the new contact points between the vehicle body 11 and the subframe 18. The body extensions 58 were 4.5 inches high in the back of the vehicle and 3 inches high in the front of the vehicle.

A vehicle lowering system was also installed in the vehicle as was a wheelchair ramp system 40 that when deployed extended out the rear side door. A VMI NORTHSTAR ramp was used in this particular example.

The OEM rear springs 70 springs were replaced with spring substitutes 71 having a spring rating of 600 lb/in having a compressed height at 2080 lbs at 14.5 inches.

What is claimed is:

1. A wheelchair conversion vehicle comprising:
a vehicle body;
a vehicle sub-frame connected to the vehicle body;
an independent rear suspension including an OEM trailing arm having a first end and a second end, the OEM trailing arm being pivotally connected to the vehicle body at the first end, the independent rear suspension and the vehicle body defining an OEM ride height;
a rear wheel OEM spindle fixedly connected to the second end of the OEM trailing arm and ratably connected to the vehicle body, the rear wheel OEM spindle moving through a defined first arc path via the OEM trailing arm pivoting at the first end, the movement of the rear wheel OEM spindle being further characterized by rotation of the rear wheel OEM spindle relative to the vehicle body to define a second arc path of a point on the rear wheel OEM spindle as a center of the rear wheel OEM spindle travels along the first arc path;
wherein the improvement comprises:
a trailing arm substitute disposed in place of the OEM trailing arm, the trailing arm substitute being configured and altered, compared to the OEM trailing arm, to not protrude into a side door opening of the wheelchair conversion vehicle and to substantially reproduce the movement of the rear wheel OEM spindle along the first or second arc paths between an upper limit and a lower limit, the upper limit being a distance above the OEM ride height and the lower limit being a distance below the OEM ride height; and a wheelchair access system configured to provide wheelchair access to the wheelchair conversion vehicle.

2. The wheelchair conversion vehicle of claim 1, wherein the trailing arm substitute is configured to reproduce the movement along the first arc path to within 0.5 inches of the first arc path at each position between the upper limit and the lower limit.

3. The wheelchair conversion vehicle of claim 1, wherein the upper limit is about 3 inches above the OEM ride-height and the lower limit is about 2 inches below the OEM ride-height.

4. The wheelchair conversion vehicle of claim 1, wherein the trailing arm substitute includes upper and lower arms.

5. The wheelchair conversion vehicle of claim 4, wherein the upper and lower arms each have a first end pivotably connected to the spindle and a second end pivotably connected to a floor mount.

6. The wheelchair conversion vehicle of claim 4, wherein the upper arm of the trailing arm substitute is shorter than the lower arm.

7. The wheelchair conversion vehicle of claim 4, wherein the upper arm of the trailing arm substitute is longer than the lower arm.

8. The wheelchair conversion vehicle of claim 1, wherein a trailing arm substitute is disposed in place of the OEM trailing arm on both sides of the vehicle.

9. The wheelchair conversion vehicle of claim 1, wherein the trailing arm substitute is configured to reproduce the movement along the first arc path to within 0.25 inches of the first arc path at each position between the upper limit and the lower limit.

10. The wheelchair conversion vehicle of claim 1, wherein the trailing arm substitute provides a rear wheel camber curve within ±0.75 degrees of an OEM rear wheel camber curve at each position between the upper limit and the lower limit.

11. The wheelchair conversion vehicle of claim 10, wherein
the camber curve is within ±0.05 degrees per inch of the OEM camber curve.

12. The wheelchair conversion vehicle of claim 1, wherein the trailing arm substitute is configured to reproduce the movement within ±0.3 inches of the second arc path at each position between the upper limit and the lower limit.

13. The wheelchair conversion vehicle of claim 12, wherein
the movement along the second arc path is within ±0.06 of an inch of the second arc path.

14. The wheelchair conversion vehicle of claim 1, wherein the improvement further comprises
a lowered vehicle floor at least in a rear side door opening area, wherein the lowered vehicle floor is lowered at least 6 inches from the height of the OEM vehicle floor.

15. The wheelchair conversion vehicle of claim 14, wherein
the lowered vehicle floor is lowered between 10 and 12 inches from the height of the OEM vehicle floor.

16. The wheelchair conversion vehicle of claim 1, wherein the improvement further comprises
at least one body extension that raises the vehicle body by at least 2 inches while substantially maintaining an OEM height of the vehicle subframe, thereby substantially maintaining an OEM roll center and ground clearance of the wheelchair conversion vehicle.

17. The wheelchair conversion vehicle of claim 16, wherein
the body is raised 3 to 6 inches.

18. The wheelchair conversion vehicle of claim 16, wherein
an OEM roll-couple is also substantially maintained.

19. The conversion vehicle of claim 1, wherein the improvement further comprises
a rear spring substitute disposed in place of an OEM rear suspension spring, wherein the rear spring substitute is longer than the OEM rear suspension spring and has a different spring rate than the OEM suspension spring.

20. The conversion vehicle of claim 1, wherein the improvement further comprises
at least one front and rear body extension configured to substantially maintain an OEM height of the vehicle subframe.

21. The conversion vehicle of claim 19, wherein the improvement further comprises
a vehicle lowering system which compresses the rear spring substitute to lower the vehicle body towards the ground, wherein the rear spring substitute returns to a pre-compression height after compression.

22. A method of manufacturing a wheelchair conversion vehicle comprising:
providing a vehicle body, a vehicle sub-frame connected to the vehicle body, an independent rear suspension including an OEM trailing arm having a first end and a second end, the OEM trailing arm being pivotally connected to the vehicle body at the first end, the independent rear suspension and the vehicle body defining an OEM ride height, a rear wheel OEM spindle fixedly connected to the second end of the OEM trailing arm and rotably connected to the vehicle body, the rear wheel OEM spindle moving through a defined first arc path via the OEM trailing arm pivoting at the first end, the movement of the rear wheel OEM spindle being further characterized by rotation of the rear wheel OEM spindle relative to the vehicle body to define a second arc path of a point on the rear wheel OEM spindle as a center of the rear wheel OEM spindle travels along the first arc path;
replacing the OEM trailing arm with a trailing arm substitute, wherein the trailing arm substitute has been altered, compared to the OEM trailing arm, so as not to protrude into a side door opening of the wheelchair conversion vehicle;
substantially reproducing the movement of the rear wheel OEM spindle along the first or second arc paths between an upper limit and a lower limit, the upper limit being a distance above the OEM ride height and the lower limit being a distance below the OEM ride height; and
installing a wheelchair access system to provide wheelchair access to the wheelchair conversion vehicle.

23. The method of claim 22, wherein
the substantially reproducing the movement reproduces the movement along the first arc path to within 0.5 inches of the first arc path at each position between the upper limit and the lower limit.

24. The method of claim 22, wherein
the upper limit is about 3 inches above the OEM ride-height and the lower limit is about 2 inches below the OEM ride-height.

25. The method of claim 22, wherein
the trailing arm substitute includes upper and lower arms.

26. The method of claim 25, wherein the upper and lower arms each have a first end pivotably connected to the spindle and a second end pivotably connected to a floor mount.

27. The method of claim 25, wherein the upper arm of the trailing arm substitute is shorter than the lower arm.

28. The method of claim 25, wherein the upper arm of the trailing arm substitute is longer than the lower arm.

29. The method of claim 22, wherein the replacing the OEM trailing arm includes replacing the OEM trailing arm with a trailing arm substitute on both sides of the vehicle.

30. The method of claim 22, wherein the substantially reproducing the movement reproduces the movement along the first arc path to within 0.25 inches of the first arc path at each position between the upper limit and the lower limit.

31. The method of claim 22, further comprising providing a rear wheel camber curve within ±0.75 degrees of an OEM rear wheel camber curve at each position between the upper limit and the lower limit.

32. The method of claim 31, wherein the camber curve is within ±0.05 degrees per inch of the OEM camber curve.

33. The method of claim 22, wherein the substantially reproducing the movement reproduces the movement within ±0.3 inches of the second arc path at each position between the upper limit and the lower limit.

34. The method of claim 33, wherein the movement along the second arc path is within ±0.06 of an inch of the second arc path.

35. The method of claim 22, further comprising lowering an OEM vehicle floor at least in a rear side door opening area at least 6 inches.

36. The method of claim 35, wherein the OEM vehicle floor is lowered between 10 and 12 inches from the height of the OEM vehicle floor.

37. The method of claim 22, further comprising disposing at least one body extension that raises the vehicle body by at least 2 inches while substantially maintaining an OEM height of the vehicle subframe, thereby substantially maintaining an OEM roll center and ground clearance of the wheelchair conversion vehicle.

38. The method of claim 37, wherein the body is raised 3 to 6 inches.

39. The method of claim 37, wherein an OEM roll-couple is also substantially maintained.

40. The method of claim 22, further comprising replacing an OEM rear suspension spring with a rear spring substitute, wherein the rear spring substitute is longer than the OEM rear suspension spring and has a different spring rate than the OEM suspension spring.

41. The method of claim 22, further comprising disposing at least one front and rear body extension configured to substantially maintain an OEM height of the vehicle subframe.

42. The method of claim 22, further comprising installing a vehicle lowering system which compresses the rear spring substitute to lower the vehicle body towards the ground, wherein the rear spring substitute returns to a pre-compression height after compression.

\* \* \* \* \*